United States Patent
Zhang

(10) Patent No.: US 11,724,718 B2
(45) Date of Patent: Aug. 15, 2023

(54) AUCTION-BASED COOPERATIVE PERCEPTION FOR AUTONOMOUS AND SEMI-AUTONOMOUS DRIVING SYSTEMS

(71) Applicant: Aptiv Technologies Limited, St. Michael (BB)

(72) Inventor: Kai Zhang, Carmel, IN (US)

(73) Assignee: Aptiv Technologies Limited, St Michael (BB)

( * ) Notice: Subject to any disclaimer, the term of this patent is extended or adjusted under 35 U.S.C. 154(b) by 247 days.

(21) Appl. No.: 17/326,090

(22) Filed: May 20, 2021

(65) Prior Publication Data

US 2022/0250654 A1 Aug. 11, 2022

Related U.S. Application Data

(60) Provisional application No. 63/144,911, filed on Feb. 2, 2021.

(51) Int. Cl.
  *B60W 60/00* (2020.01)
  *G08G 1/00* (2006.01)
  *H04W 4/46* (2018.01)

(52) U.S. Cl.
  CPC .. *B60W 60/0017* (2020.02); *B60W 60/00272* (2020.02); *G08G 1/20* (2013.01); *H04W 4/46* (2018.02)

(58) Field of Classification Search
  None
  See application file for complete search history.

(56) References Cited

U.S. PATENT DOCUMENTS 10,527,706 B1 * 1/2020 Zhang ................ G01S 5/0205
10,782,384 B2 9/2020 Zhang et al.
(Continued)

OTHER PUBLICATIONS

Allig, "Alignment of Perception Information for Cooperative Perception", Jun. 2019, pp. 1849-1854.
(Continued)

*Primary Examiner* — James J Lee
*Assistant Examiner* — David Hatch
(74) *Attorney, Agent, or Firm* — Sawtooth Patent Group PLLC

(57) ABSTRACT

This document describes techniques, apparatuses, and systems that can implement auction-based cooperative perception for autonomous and semi-autonomous driving systems. The described techniques, apparatuses, and systems cooperatively use perception systems of an autonomous or semi-autonomous vehicle (AV) in a fleet of connected AVs to provide perception data to the entire fleet. An AV of the fleet is selected to act as an auction system (e.g., an auctioneer) and sends an announcement offering perception tasks to the fleet for bidding. The AVs of the fleet determine whether they have the communication and computational capabilities to perform the tasks and, if so, submit bids to perform one or more tasks. The auctioneer awards the tasks, and the bid-winning AV(s) perform the tasks and update the fleet. In this way, the described techniques, apparatuses, and systems can provide perception services with increased coverage and quality, which can make autonomous and semi-autonomous driving systems safer.

20 Claims, 7 Drawing Sheets

(56) References Cited

U.S. PATENT DOCUMENTS

| | | | | |
|---|---|---|---|---|
| 2016/0253748 A1* | 9/2016 | Levy | .................. | G08G 1/205 |
| | | | | 705/13 |
| 2019/0361460 A1* | 11/2019 | Medeiros | ................. | G05D 1/00 |
| 2021/0304607 A1* | 9/2021 | Grace | .................. | H04W 4/46 |
| 2022/0171385 A1* | 6/2022 | Cui | .................. | B60W 60/001 |
| 2022/0343241 A1* | 10/2022 | Jha | .................. | G01C 21/3841 |

OTHER PUBLICATIONS

Dariani, et al., "EU_MAVEN D3.2: Cooperative Environment Perception Algorithms", Jan. 2019, 36 pages.
Granstrom, et al., "Extended Object Tracking: Introduction, Overview, and Applications", Dec. 2017, pp. 139-174.
Houenou, et al., "A Track-to-Track Association Method fo Automotive Perception Systems", Jun. 2012, pp. 704-710.
Scheel, "Fully Bayesian Vehicle Tracking Using Extended Object Models", Dec. 2019, 196 pages.
Seelinger, et al., "Inter-vehicle information-fusion with shared perception information", Oct. 2014, pp. 2087-2093.
Vo, et al., "Multitarget Tracking", Sep. 2015, 23 pages.

* cited by examiner

500

```
┌─────────────────────────────────────────────────────┐
│ Receive, by at least one connected autonomous       │
│ vehicle (AV) of a vehicle fleet and from an auction │
│ system, a bid announcement for performing a         │
│ perception task using the connected AV, the bid     │
│ announcement including a set of computation and     │
│ communication capabilities for performing the       │
│ perception task using the connected AV              │
│                        502                          │
└─────────────────────────────────────────────────────┘
                          │
                          ▼
┌─────────────────────────────────────────────────────┐
│ Determine, based on the bid announcement, the       │
│ connected AV has the computation and communication  │
│ capabilities for performing the perception task     │
│ using the connected AV                              │
│                        504                          │
└─────────────────────────────────────────────────────┘
                          │
                          ▼
┌─────────────────────────────────────────────────────┐
│ Estimate, based on a bidding computation, a cost    │
│ for the computation and communication capabilities  │
│ of the connected AV to perform the perception task  │
│                        506                          │
└─────────────────────────────────────────────────────┘
                          │
                          ▼
┌─────────────────────────────────────────────────────┐
│ Send to the auction system, based on the estimated  │
│ cost, a bid for the computation and communication   │
│ capabilities of the connected AV to perform the     │
│ perception task                                     │
│                        508                          │
└─────────────────────────────────────────────────────┘
                          │
                          ▼
                         (A)
```

```
┌─────────────────────────────────────────────────┐
│ Send, by an auction system to at least one      │
│ connected autonomous vehicle (AV) of a vehicle  │
│ fleet, a bid announcement for performing a      │
│ perception task using the connected AV, the bid │
│ announcement including a set of computation     │
│ and communication capabilities for performing   │
│ the perception task using the connected AV      │
│                     602                         │
└─────────────────────────────────────────────────┘
                         │
                         ▼
┌─────────────────────────────────────────────────┐
│ Receive, from a connected AV that has the       │
│ computation and communication capabilities for  │
│ performing the perception task, a bid for the   │
│ computation and communication capabilities of   │
│ the connected AV to perform the perception      │
│ task, the bid based on an estimated cost for    │
│ the computation and communication capabilities  │
│ of the connected AV to perform the perception   │
│ task, the estimated cost determined using a     │
│ bidding computation                             │
│                     604                         │
└─────────────────────────────────────────────────┘
                         │
                         ▼
┌─────────────────────────────────────────────────┐
│ Determine, in response to receiving the bid     │
│ from the connected AV, at least one connected   │
│ AV to act as a bid-winning AV, based on the bid │
│                     606                         │
└─────────────────────────────────────────────────┘
                         │
                         ▼
┌─────────────────────────────────────────────────┐
│ Send, to the at least one bid-winning AV and    │
│ from the auction system, information for the    │
│ computation and communication capabilities of   │
│ the bid-winning AV to use for performing the    │
│ perception tasks                                │
│                     608                         │
└─────────────────────────────────────────────────┘
```

*FIG. 6*

AUCTION-BASED COOPERATIVE PERCEPTION FOR AUTONOMOUS AND SEMI-AUTONOMOUS DRIVING SYSTEMS

CROSS-REFERENCE TO RELATED APPLICATION

This application claims the benefit under 35 U.S.C. 119(e) of U.S. Provisional Application No. 63/144,911, filed Feb. 2, 2021, the disclosure of which is incorporated by reference in its entirety herein.

BACKGROUND

Autonomous and semi-autonomous driving systems can use perception systems that include cameras and other equipment to detect objects in their environment. Perception systems can include cameras and other sensors, such as radar or lasers, to identify pedestrians, vehicles, and other objects. Some environments, however, present challenges to perception systems, including occlusions or blind spots caused by structures or other objects. For example, a large vehicle or building at a corner of an intersection can occlude a portion of a roadway leading into the intersection. An occluded roadway may prevent or delay the perception system's detection of another vehicle entering the intersection, which can lead to unsafe driving, potentially resulting in collisions.

SUMMARY

This document describes techniques and systems that can enable auction-based cooperative perception for autonomous and semi-autonomous driving systems. This document also describes methods performed by the summarized techniques and systems set forth herein, as well as means for performing these methods. The described techniques and systems cooperatively use the perception systems of one or more vehicles in a fleet of connected autonomous or semi-autonomous vehicles (also referred to as a fleet or a connected fleet) to provide perception data to the entire fleet. For clarity in this document, the term "AV" will be used to mean an autonomous or semi-autonomous vehicle, including ground and/or aerial vehicles (e.g., drones).

For example, a vehicle of a connected fleet, or a computing system of the vehicle, can be selected to act as an auction system (e.g., an auctioneer) and send an announcement offering various perception tasks to the fleet for bidding. The tasks can include providing information such as the bidder's position and orientation, the sender's sensor data and field-of-view information, and object detection lists (e.g., position, orientation, and motion information for detected objects). The vehicles of the fleet can determine whether they have the communication and computational capabilities to perform the tasks and, if so, the auction system can accept a bid to perform one or more tasks. The bid can be a response to the announcement that includes information about how the task will be performed. For example, information about the time it will take the bidder to complete the task, how often the bidder can repeat the task in a given time, details about the bidder's sensors that will be used to perform the task (e.g., type, resolution, quality), and so forth. The auction system then awards the tasks to one or more vehicles of the fleet, and the bid-winning vehicle(s) perform the tasks and update the fleet. In this way, the described systems and techniques can provide perception data and services with increased coverage and quality while reducing the risk of a single-point failure by distributing tasks and rotating the role of the auction system between the vehicles of the fleet, which can make autonomous and semi-autonomous driving systems safer.

This Summary introduces simplified concepts related to indirectly verifying speed limits based on contextual information for autonomous and semi-autonomous driving systems, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of auction-based cooperative perception for autonomous and semi-autonomous driving systems are described in this document with reference to the following figures. The same numbers are often used throughout the drawings to reference like features and components:

FIGS. 5-1 and FIG. 5-2 illustrate an example method to enable auction-based cooperative perception for autonomous and semi-autonomous driving systems; and FIG. 6 illustrates another example method to enable auction-based cooperative perception for autonomous and semi-autonomous driving systems.

DETAILED DESCRIPTION

Overview

Figure 1:
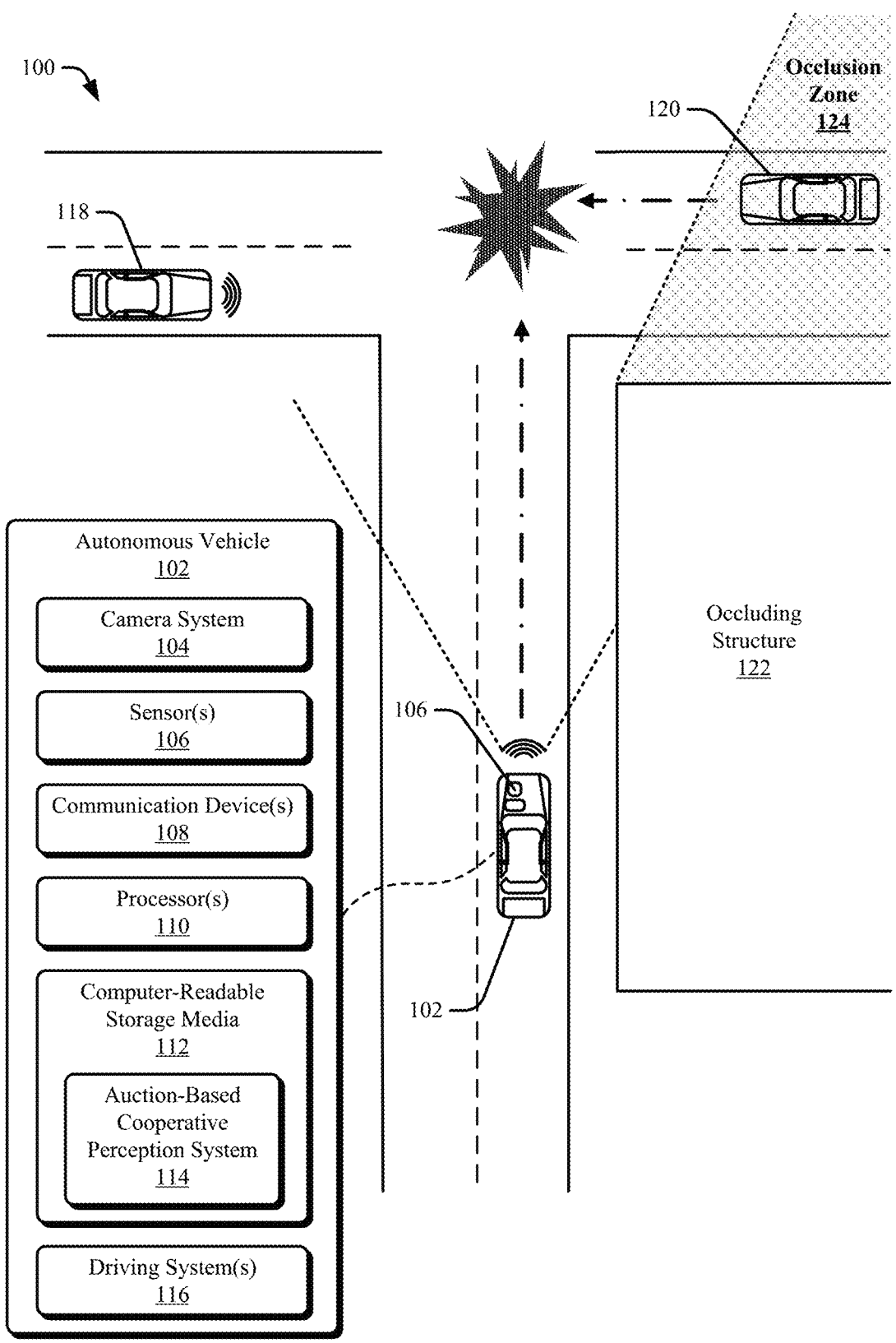
FIG. 1 illustrates an example environment in which an auction-based cooperative perception system can enable auction-based cooperative perception for autonomous and semi-autonomous driving systems of an autonomous or semi-autonomous vehicle (AV)

Autonomous and semi-autonomous vehicles (AV) use perception systems to detect and describe the environment around the AV. Cameras and other sensors, such as radar and Lidar, can identify objects in the AV's environment, including roads, other vehicles, and pedestrians. The data from the sensors may be merged and correlated to the camera data to estimate the size, shape, position, and velocity of the identified objects. As described above, some environments can present challenges to perception systems, including local sensor failure or degradation, electronic interference, or perception occlusions (e.g., blind spots) caused by structures or other objects, which can prevent or delay the perception system's detection of some objects, such as another vehicle entering an occluded intersection, which can lead to unsafe operation of the AV.

Some perception systems use techniques in which perception data from sensors in multiple connected vehicles is collected and integrated by a centralized entity and then distributed to the connected vehicles. Because these systems rely on the centralized entity for perception information, timely management is a primary concern; the connected vehicles may be exposed to a higher risk of not receiving perception data in time, due to a single-point failure of the centralized entity. Further, the communication and computation costs (e.g., as defined in turns of computing resources used or time spent) for the centralized entity may increase the risk of degraded performance. Entirely distributed systems can suffer from lower-quality perception computations because of, for example, communication latency or lack of sufficient computational resources. In contrast, the described techniques and systems can be used to enable auction-based cooperative perception, which can reduce the risk of single-point failure, improve the quality of perception, and increase the efficiency with which computational and communication resources are used.

Consider an example in which a subject AV (e.g., an ego-vehicle) is part of a fleet of connected AVs. In this example, the subject AV is northbound approaching a four-way street intersection with a large building on the southeast corner. Assume that the building is large enough to block the subject AV's perception sensors from detecting another vehicle traveling westbound on the street north of the building until the other vehicle is about to enter the intersection. Depending on the speed and intended path of the subject AV and the other vehicle, this situation can present a risk of collision.

Assume also that another AV, which is a member of the connected fleet, is traveling eastbound toward the intersection and has an unobstructed sensor view of the westbound vehicle. Using the described techniques and systems, an AV (the subject AV, the other AV, or some other AV of the connected fleet) is acting as an auction system (e.g., an auctioneer) for the connected fleet. The auction system offers perception tasks for bid to the connected fleet. In this example, the eastbound AV has been named the bid-winning AV for a perception task of providing an object detection list (e.g., a track) to the connected fleet. The eastbound AV will detect the westbound vehicle and share the object detection list data with the rest of the connected fleet (either directly, from the bid-winning AV, or via the auctioneer) according to the described systems and techniques.

When the subject AV receives a cooperative perception message (CPM), the perception system of the subject AV is updated with the data from the other AV, and the autonomous driving system of the subject AV can take proper action to account for the other vehicle (e.g., reduce speed or change lanes). In this manner, the described systems and techniques for auction-based cooperative perception for autonomous and semi-autonomous driving systems can provide increased safety and comfort for the subject AV (and any passengers). The auction-based system provides balance between centralized cooperative perception systems and entirely decentralized cooperative perception systems with respect to communication efficiency, computational efficiency, and the quality of the solution.

In other implementations, the cooperative perception system can also be used for cooperative localization. Localization is the implementation of algorithms to estimate where the AV is (e.g., within a few centimeters). In the localization implementation, the auctioneer offers localization tasks instead of, or in addition to, perception tasks. These examples are just a few examples of the described techniques and systems to enable auction-based cooperative perception for autonomous and semi-autonomous driving systems. This document describes other examples and implementations.

Systems and Apparatuses

FIG. 1 illustrates an example environment 100 in which an auction-based cooperative perception system 114 (also referred to as an auction system 114) can enable auction-based cooperative perception for autonomous and semi-autonomous driving systems of an autonomous or semi-autonomous vehicle (AV) 102 (e.g., an AV 102). The environment 100 can include roads, shoulders, sidewalks, parking lots or structures, or airspace (e.g., for aerial vehicles). Although illustrated as a car, the AV 102 can represent other types of motorized vehicles (e.g., a motorcycle, a bus, a tractor, a semi-trailer truck, or construction equipment). The AV 102 may also be an aerial vehicle (e.g., a drone, a helicopter, or an airplane). In general, manufacturers can use the auction system 114 in any moving platform that can travel on or near the roads or in the airspace of the environment 100.

The AV 102 includes a camera system 104 that is mounted on or near the front of the AV 102. The camera system 104 can take video and/or photographic images or video of the environment 100 around the AV 102, including roads and airspace. In other implementations, a portion of the camera system 104 can be mounted into a rear-view mirror of the AV 102 to have a field-of-view of the environment 100. In other implementations, the camera system 104 can project the field-of-view from any exterior surface of the AV 102. For example, vehicle manufacturers can integrate at least a part of the camera system 104 into a side mirror, bumper, roof, or any other interior or exterior location where the field-of-view includes the environment 100 (e.g., roads and/or airspace) around the AV 102. In general, vehicle manufacturers can design the location of the camera system 104 to provide an instrument field-of-view that sufficiently encompasses the environment 100 around the AV 102.

The AV 102 also includes one or more sensors 106 to provide input data to one or more processors 110. The input data from the sensors 106 can be used to detect objects in the environment 100 around the AV 102. For example, the input data of the sensors 106 can be used to detect pedestrians, animals, other vehicles, debris, buildings, wires, traffic signals, signs, or other structures. The sensors 106 can include a radar system, a positioning system (e.g., a radio-navigation-satellite system (RNSS) such as the global positioning system (GPS) in the United States or the Galileo system available in Europe), a lidar system, a radar system, an inertial measurement unit (IMU), such as a micro-electromechanical system (MEMS) IMU, or any combination thereof. The radar system or the lidar system can use electromagnetic signals to detect objects in the environment 100 around the AV 102. The positioning system can determine a position of the AV 102 by receiving signals obtained from the positioning system as the AV 102 is traveling in the environment 100. The IMU can generate data that can be used to, for example, calculate three-dimensional position, angular rates, linear velocity, and position relative to a global coordinate system. The data generated by the IMU can also be used to predict future position, direction, velocity, and other parameters of the AV.

The AV 102 also includes communication devices 108, one or more processors 110, and one or more computer-readable storage media (CRM) 112. The communication devices 108 can be radio frequency (RF) transceivers to transmit and receive RF signals. The transceivers can include one or more transmitters and receivers incorporated together on the same integrated circuit (e.g., a transceiver integrated circuit) or separately on different integrated circuits. The communication devices 108 can be used to communicate with remote computing devices (e.g., a server or computing system providing navigation information or perception data), nearby structures (e.g., traffic signs or signals, pedestrian-operated devices, such as a mobile phone), or other vehicles, including other members of the connected fleet. For example, the AV 102 can use the communication devices 108 to wirelessly exchange information with nearby vehicles or other devices using vehicle-to-vehicle (V2V) or vehicle-to-everything (V2X) communication. The AV 102 can use V2V or V2X communication to obtain the speed, location, and heading of nearby vehicles. Similarly, the AV 102 can use the communication devices 108 to wirelessly receive information from other nearby devices to detect objects and pedestrians in the environment 100.

The communication devices 108 can include a sensor interface and a driving system interface. The sensor interface and the driving system interface can transmit data over a communication bus of the AV 102, for example, when the individual components of the auction system 114 are integrated within the AV 102.

The processor 110 can be a microprocessor or a system-on-chip of a computing device. The processor 110 executes computer-executable instructions stored within the CRM 112. As an example, the processor 110 can execute the auction system 114 to participate in the auction-based cooperative perception system (e.g., receive or send one or more of announcements, tasks, updates, bids, or cooperative perception messages).

The processor 110 can receive, via the sensors 106 or the camera system 104, data as input to the auction system 114. As an example, the processor 110 can receive image data or video data from the camera system 104. Similarly, the processor 110 can send configuration data or requests to the one or more sensors 106 or the camera system 104. The processor 110 can also execute the auction system 114 to perceive objects in the environment 100 (directly or via a CPM) and provide data as an input to one or more driving systems 116.

The CRM 112 can provide the AV 102 with persistent and nonpersistent storage of executable instructions (e.g., firmware, recovery firmware, software, applications, modules, programs, functions) and data (e.g., user data, operational data) to support the execution of the executable instructions. For example, the CRM 112 includes instructions that, when executed by the processor 110, execute the auction system 114. Examples of the CRM 112 include volatile memory and non-volatile memory, fixed and removable media devices, and any suitable memory device or electronic data storage that maintains executable instructions and supporting data. The CRM 112 can include various implementations of random-access memory (RAM), static RAM (SRAM), dynamic RAM (DRAM), non-volatile RAM (NVRAM), read-only memory (ROM), flash memory, and other storage memory types in various memory device configurations. The CRM 112 excludes propagating signals. The CRM 112 can be a solid-state drive (SSD) or a hard disk drive (HDD).

The auction system 114 can enable the AV to use auction-based cooperative perception. For example, the auction system 114 can enable the AV 102 to interact with another vehicle 118 of the connected fleet so that either or both the AV 102 or the other vehicle 118 can act as the auctioneer (auction system), the bid-winning AV, or both. In this way, the AV 102 can receive or send announcements, tasks, updates, bids, or cooperative perception messages. The operation and functionality of the auction system 114 are described in greater detail with respect to FIGS. 2 through 6.

The AV 102 also includes the driving systems 116 that use data from the camera system 104, the sensors 106, and the auction system 114. The driving systems 116 can include an autonomous and semi-autonomous driving system. Generally, the driving systems 116 use perception data determined by the AV 102 or received from another source via the auction system 114 to control the operation of the AV 102. Controlling the operation of the AV 102 can include controlling the AV 102 by way of steering, accelerating, braking, shifting gears, flashing lights, enabling a horn, enabling hazard or turn signals, or otherwise controlling the AV 102 to safely navigate the environment 100. For example, the driving systems 116 can provide braking and/or a speed reduction based on an indication from a CPM that an undetected vehicle 120 is approaching an intersection from behind an occluding structure 122 (e.g., a structure that is occluding the perception systems of the AV 102), as shown by an occlusion zone 124, represented by a shaded area in which the undetected vehicle 120 is traveling. As another example, the semi-autonomous driving system can provide alerts when the AV 102 is approaching an area of perception system occlusion.

Figure 2:
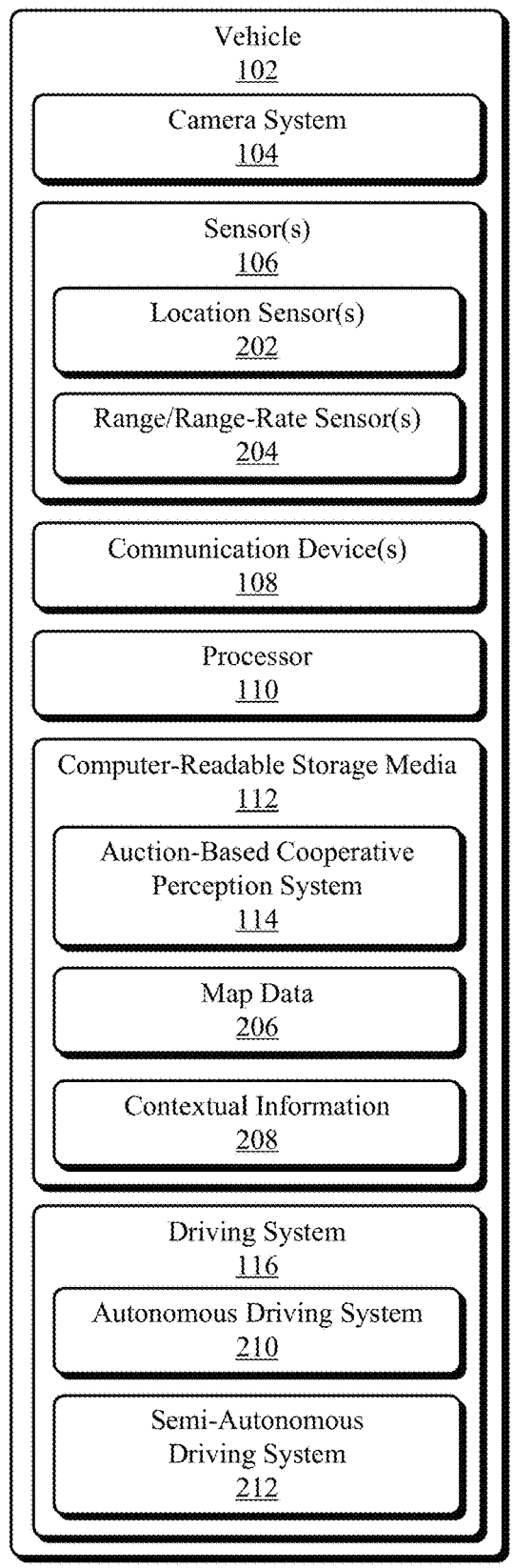
FIG. 2 illustrates an example configuration of the auction system of FIG. 1 that can enable auction-based cooperative perception for an autonomous or semi-autonomous driving system of an AV.

FIG. 2 illustrates an example configuration of the auction system 114 that can enable auction-based cooperative perception for an autonomous driving system 210 or semi-autonomous driving system 212. As described with respect to FIG. 1, the AV 102 can include the camera system 104, the sensors 106, the communication devices 108, the processor 110, the CRM 112, and the driving system 116.

The sensors 106 can include a location sensor 202 and one or more range and range-rate sensors 204. The location sensor 202, for example, can include a positioning system as mentioned above that can determine a position of the AV 102. For example, the auction system 114 can use the position data from the location sensor 202 to provide a position of the AV 102 to the connected fleet via a CPM. Map data 206 and/or contextual information 208 can be used to verify or augment position data. For example, the map data 206 can provide a map of traveling routes (e.g., highways, freeways, streets, roads) in an area along with locations of potential occlusion zones 124. The contextual information 208 can include, for example, image data from the camera system 104 or another source, which can be used to verify data such as structure heights or determine landmarks to augment position data. The map data 206 and the contextual information 208 can be stored in the CRM 112. In some implementations, the map data 206 or the contextual information 208 may be stored in an online database or on a remote computing device, and the processor 110 can download, via the communication devices 108, the map data 206 or the contextual information 208.

The range and range-rate sensors 204 can, for example, include a radar system, a lidar system, or a combination thereof. The radar system or the lidar system can use electromagnetic signals to detect objects in the environment around the AV 102 (e.g., the environment 100), such as other vehicles, pedestrians, debris, or structures. Data from the range and range-rate sensors 204 can provide a direct input to the auction system 114. For example, the range and range-rate sensors 204 can determine the traveling speed of a vehicle in front of the AV 102 or nearby vehicles traveling in the same direction as the AV 102. As described with respect to FIGS. 3-6, the auction system 114 can provide the traveling speed of the other vehicles to the connected fleet via a CPM.

The AV 102 also includes at least one driving system 116, such as an autonomous driving system 210 or a semi-autonomous driving system 212, that relies in part on data from the auction system 114 to control the operation of the AV 102 (e.g., detect objects that are in an occlusion zone 124). Generally, the driving systems 116 use data provided by the auction system 114, the camera system 104, and the sensors 106 to control operations of the vehicle and perform certain functions. For example, the semi-autonomous driving system 212 can provide an alert, based on data from the auction system 114, that an occluded vehicle 120 exists and is approaching an intersection that the AV 102 is about to enter. Similarly, the autonomous driving system 210 can navigate the AV 102 to a particular destination while avoiding occluded vehicles 120 and other objects or pedestrians that may be in an occlusion zone 124 as indicated by the auction system 114 (e.g., via perception data provided in a CPM). The perception data provided by the auction system 114 can provide information about the environment 100 around the AV 102 to enable the autonomous driving system 210 to adjust the speed or position of the AV 102 to safely navigate.

Figure 3:
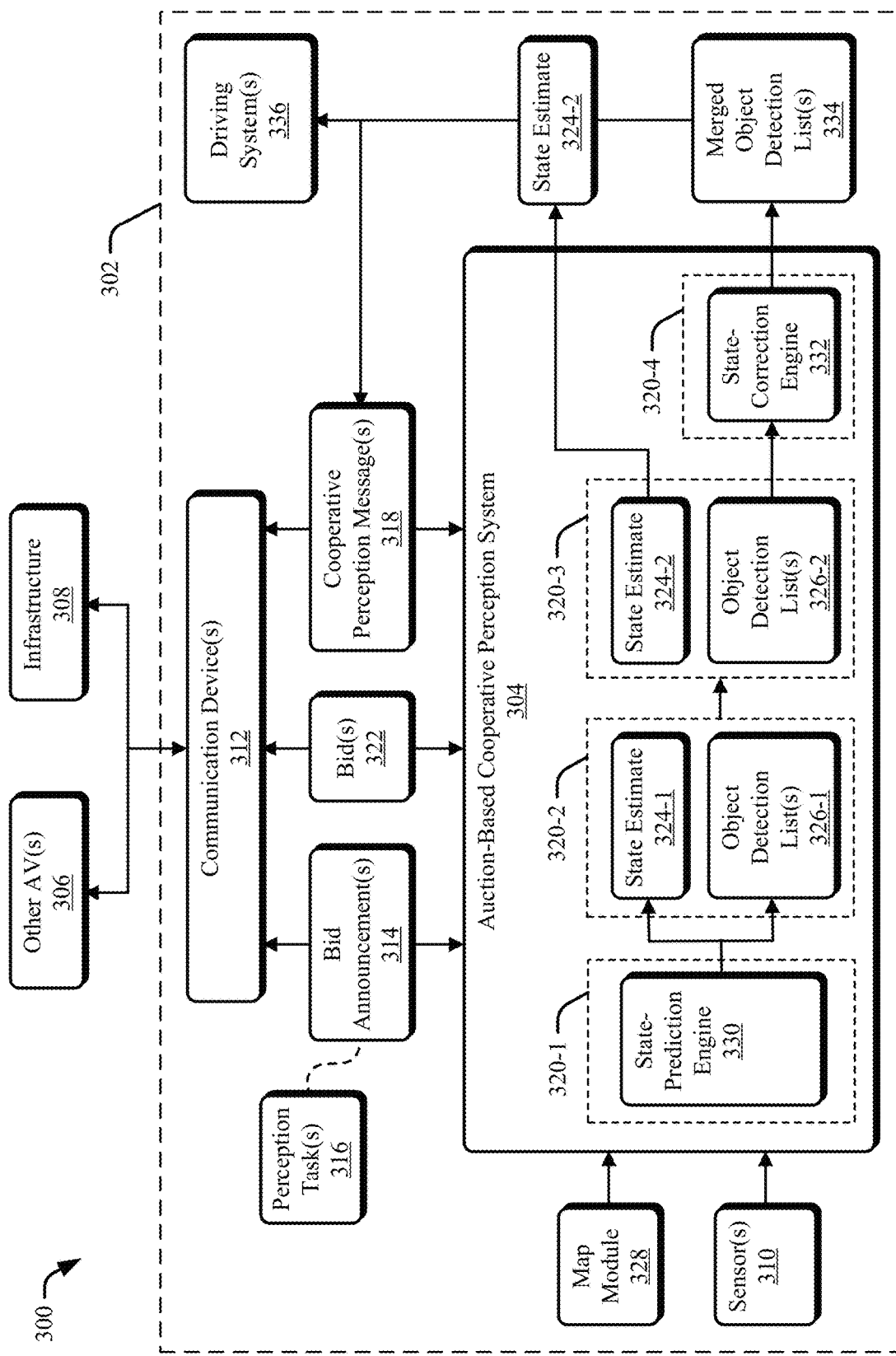
FIG. 3 illustrates an example architecture for an AV that includes an auction-based cooperative perception system and is a member of a fleet of connected autonomous or semi-autonomous vehicles.

FIG. 3 illustrates an example architecture 300 for an example AV 302 that is a member of a fleet of connected AVs (also referred to as the fleet or the connected fleet) and includes an auction-based cooperative perception system 304, which may be referred to as an auction system (e.g., the auction system 114). The connected fleet can include a plurality of AVs that are in electronic communication with each other. For example, the fleet may include one or more of the other AVs 306 (e.g., the other AV 118) and infrastructure 308. The AVs of the fleet can include autonomous (or semi-autonomous) ground vehicles, autonomous (or semi-autonomous) aerial vehicles, or both. The other AV's 306 and infrastructure 308 can include vehicles (ground or aerial), structures, and/or devices with sensing and communication capability and that can provide perception information to the example AV 302. An example of a connected fleet is described with reference to FIG. 4. The example AV 302 may also include one or more sensor(s) 310 and communication devices 312 (e.g., the sensors 106 and communication devices 108 of FIGS. 1 and 2).

The AV 302 can use the communication devices 312 to communicate with the connected fleet. The auction system 304 can also send and receive information and message via the communication devices 312. For example, the AV 302 (and the auction system 304) can receive, from another auction system, a bid announcement 314 for performing one or more perception tasks 316 using the connected AV 302. The other auction system may be, for example, an auction system of another member of the connected fleet (e.g., the other AV 306 or the infrastructure 308), that is acting as an "auctioneer" to offer the perception tasks 316 to the connected fleet, or from an entity of the infrastructure 308 that is acting as the "auctioneer."

The entity that acts as the other auction system (e.g., the "auctioneer") can be selected using any of several techniques. For example, when the other auction system is another member of the connected fleet, it can be selected using a random selection method or a rotational selection method in which respective members of the connected fleet take turns serving as the other auction system based on an algorithm or a token system.

The bid announcement 314 can include a set of computation and communication capabilities for performing the perception tasks 316 (e.g., computation and communication capabilities for at least the auction system 304 and the sensors 310, along with other processing resources, latency information, and communication bandwidth for performing the perception tasks 316). The perception tasks 316 can include one or more items of a CPM 318. The CPM 318 may include, for example, a state estimate or "ego-pose" of an entity that performs the perception tasks 316 and sends the cooperative perception message 318 (e.g., the AV 302 or the other AV 306). The state estimate can include position and velocity information for the entity, along with estimate error information (e.g., an estimation error covariance matrix).

The CPM 318 can also include a list of the entity's sensors, the sensors' fields of view, and object detection lists. The object detection lists, which are sometimes referred to as "tracks," can include state estimates for objects detected by the sender entity, such as other vehicles or pedestrians, and can include information about the parameter data and the object detection list, state parameters, and confidence values (e.g., estimate error information as described above). Different sensors can have different track structures. For example, based on the sensors, data for a given object detection list may include a timestamp, sensor meta-data, an identification (e.g., to distinguish object detection lists), a state estimate (e.g., position and velocity), and an estimation error covariance matrix.

The auction system 304 (or 114) can also determine, based on the bid announcement 314, that the connected AV 302 has the computation and communication capabilities for performing the perception task 316 (e.g., that the auction system 304 and other components can perform the perception task 316). Based on a bidding computation 320, the AV 302 can also estimate a cost (e.g., in terms of time, processing resources) for using the computation and communication capabilities of the AV 302 to perform the perception task. For example, the cost (e.g., a "self-interest" of the AV 302) can be a determination of whether the AV will bid, in view of the perception task 316 and the bidding computation 320. The bidding computation 320 may include several operations, as described below.

In some cases, based on the bidding computation 320 (which specifies what calculations the AV 302 would have to do to perform the perception task 316), the AV 302 may determine that performing the perception task 316 will consume a large amount of communication and computation resources (e.g., has a high cost) and determine not to bid, even if it has the proper capabilities. In other cases, the AV 302 may determine that the cost is appropriate to submit a bid. Based at least in part on the cost, the AV 302 can send, to the other auction system, a bid 322 for using the computation and communication capabilities of the AV 302 to perform the perception task. In some implementations, the bid can include information about the determined costs and evaluated capabilities (e.g., what the AV 302, the auction system 304, and the sensors 310 can do, the quality of the computations, how fast the computations can be performed and communicated, and how often they can be repeated).

The bidding computation 320 can include an alignment operation 320-1. For example, the alignment operation 320-1 can include computing, determining, or otherwise obtaining one or more parameters, including a state estimate 324-1 of the bid-winning AV (e.g., the AV 302) and an object detection list 326-1 for respective objects detected by the bid-winning AV. The state estimate 324-1 and object detection lists 326-1 include position and motion parameters and confidence values for the parameters (e.g., a determination of the estimation error covariance matrices). The state estimate 324-1 includes at least a predicted position and a predicted orientation of the bid-winning AV. Similarly, the object detection lists 326-1 include at least a predicted position and a predicted orientation of the objects detected by the bid-winning AV.

The bidding computation 320 can also include a transformation operation 320-2. For example, the state estimate 324 and the object detection lists 326 (e.g., the predicted positions and predicted orientations for the bid-winning AV and the detected objects) can be described using a coordinate system that is based on the bid-winning AV (e.g., body-fixed or local coordinates that are based on the AV 302) or another coordinate system. The auction system 304 can perform the transformation operation 320-2 to convert the coordinates of the predicted positions and orientations of the bid-winning AV and the detected objects to a global coordinate system that is independent of the AV 302 (e.g., using a coordinate transformation technique, such as a geometric transformation). The coordinates of the estimation error covariance matrices are also transformed so that error estimates and confidence values are properly described. Similarly, the timing information (e.g., when the data was collected) is based on local clocks of the bid-winning AV. The auction system 304 can use the timestamp data from the object detection lists 326-1 to convert the data to a global time to improve the accuracy of object location predictions.

The aligned and transformed positions and orientations of the AV 302 (e.g., a state estimate 324-2) and its perceived objects (e.g., the objects of an object detection list 326-2) can be determined using a static model, in which at least a turn rate, an orientation, and an acceleration of the bid-winning AV and of detected objects of the object detection list are modeled as constants. In other implementations, the positions and orientations can be determined using a dynamic model, in which at least the turn rate, the orientation, and the acceleration of the bid-winning AV and of detected objects of the object detection list are modeled using at least a transition density and a Chapman-Kolmogorov equation. For example, a dynamic model describes how an object state evolves over time. For a moving object, this describes how the object moves, which involves the position and the kinematic states that describe the motion (e.g., velocity, acceleration, turn-rate). The movement also involves descriptions of how the extent changes over time (e.g., a typical object rotates when the object turns, from an observer's perspective) and how the number of measurements changes over time (often there are more measurements the closer to the sensor the object is).

There are two probabilistic parts to dynamics modeling that are important: the transition density and the Chapman-Kolmogorov equation. The transition density is denoted as $p(x_{k+1}|x_k)$ and describes the transition of the state from time step k to time step k+1, i.e., from $x_k$ to $x_{k+1}$. The Chapman-Kolmogorov equation, $p(x_{k+1}) = \int p(x_{k+1}|x_k) p(x_k) \, dx_k$ describes how, given a prior state density p ($x_k$) and a transition density, the predicted density $p(x_{k+1})$ is computed.

When the extended object is a rigid body, its size and shape do not change over time, but the orientation of the shape typically rotates when the object turns. If the object is described by a set of points on a rigid body, the point of rotation must be specified, and the center-of-mass is a suitable choice. For the more common spatial models, a typical assumption for the extent is to assume that its orientation is aligned with the heading of the object (e.g., this is the case in the so-called kinematic bicycle models). When the heading and orientation are aligned, the rotation of the extent does not have to be explicitly modeled as it is implicitly modeled by the object's heading. However, if this is not the case, the point of the rotation must be specified. Again, a suitable choice is the object's center-of-mass.

When multiple objects are present, a common assumption is that the objects change independently of each other, resulting in the object estimates being predicted independently. An independent prediction may result in physically impossible object state estimates (e.g., overlapping or intersecting objects). To better model target interactions, social force modeling can be used. In group object tracking, where several objects form groups while remaining distinguishable, it is possible to apply, for example, a leader-follower model, allowing for the individual objects to be predicted dependently.

In some implementations, the state estimate 324-1 or 324-2 and the object detection lists 326-1 or 326-2 may include predictions (or estimates) for a position state, a kinematic state, and/or an extent state. The position state may be either or both of an (x,y) position or an (x,y,z) position. For example, the (x,y) position can be a two-dimensional position on a horizontal plane (e.g., on a map) or a vertical plane (e.g., an elevation view). The (x,y,z) position is a three-dimensional position. The kinematic state includes motion parameters of the bid-winning AV or the detected objects (e.g., velocity, acceleration, heading, turn-rate). The extent state includes parameters that determine the shape and the size of the object, as well as the orientation of the shape (e.g., the front or back of the object, a side of the object, or a top or bottom of the object). The kinematic state can be used to make predictions of the position and/or extent states (e.g., based on a velocity and a heading, the auction system 304 can predict a future position and/or orientation).

The positions and orientations for the state estimate 324-1 or 324-2 and the object detection lists 326-1 or 326-2 can be predicted over any suitable period of time (e.g., starting with the current state and predicting the state over the next 0.1 seconds (s), 0.5 s, 1 s, 5 s, and so forth). In some implementations, the positions and orientations are computed or estimated, and an estimation-error covariance matrix can be generated to provide the confidence values associated with the parameter estimates and predictions.

The state estimate 324-1 or 324-2 and object detection lists 326-1 or 326-2 can be determined using information from any of a variety of sources, including the sensors 310 (or 106) and a map module 328. The map module 328 can be any suitable electronic mapping system that can provide updatable map information, for example, local geographical information (e.g., elevation, slope, and so forth) and road information (e.g., road names, addresses of buildings and other locations, and the like). To perform the computations, the auction system 304 may include, or be associated with, one or more processors. For example, the auction system 304 may include a state-prediction engine 330 and a state-correction engine 332. Either or both of the state-prediction engine 330 and the state-correction engine 332 may be a system-on-chip (SoC) or another type of processor. In some implementations, the state-prediction engine 330 and the state-correction engine 332 can be separate processors (as shown). In other implementations, the state-prediction engine 330 and the state-correction engine 332 may be combined as a single SoC. In either case, the state-prediction engine 330 and the state-correction engine 332 can be integrated with the auction system 304 or separate components in electrical communication with the auction system 304.

The cooperative perception process can be iterative. That is, as the bid-winning AV performs the perception tasks 316 and sends the cooperative perception messages 318, it may receive new information from its sensors or another source (e.g., a new bid announcement 314). The auction system 304 can use the new information to correct (or update) the estimates, predictions, and/or object detection lists. Further, if the bid-winning AV or the auctioneer cannot perform its duties (e.g., due to system error or sensor failure), the auction process can restart with a new bid announcement 314.

The bidding computation 320 can also include an alignment operation 320-3. For example, the predicted positions of the objects of the object detection lists 326-2 can be aligned to a common reference point by constructing a validation matrix. The auction system 304 can construct the validation matrix to align the predicted positions using any of a number of techniques. For example, Mahalanobis Distances between the positions of every received track and global track can be used to construct the validation matrix. The states of the tracks (object detections) may be aligned to the common reference point using one or more of a Kalman filter, an extended Kalman filter, an unscented Kalman filter, or a particle filter. The validation matrix, $\Omega$, is defined (e.g., $\triangleq$) as: $\Omega \triangleq [\omega_{jl}]$ j=1, ..., $n_k$; l=0, 1, ..., $N_k$. The binary element $\omega_{jl}$ indicates whether measurement j lies in the validation gate of landmark l where the gate is used to select the measurements in the state update when their origin is uncertain.

The bidding computation 320 can also include a merging operation 320-4. The merging operation 320-4 can use, for example, a covariance intersection method to compute an output state vector of the detected objects of the aligned object detection lists 326-2 (e.g., aligned tracks). The output state vector becomes a merged object detection list 334, which can be included with the CPM 318 and another covariance matrix for the output state vector for correcting the output state vector. For example, the auction system 304 (e.g., using the state-correction engine 332) can use the covariance intersection method to compute the output state vector X and its covariance matrix P of the tracked objects in the merged object detection list 334. When there is cross-correlation between the measurements a as well as b(a, b $\in$ [1, ..., $n_k$] and a≠b), and the covariances of the different measurements are weighted using a variable w$\in$[0,1], the convex combination algorithms use equations (1) and (2) to search for an optimal value for w with regard to some optimization criterion, such as minimizing the trace of the resulting covariance matrix P or the determinant of P:

$$X = P(wP_a^{-1}X_a + (1-w)P_b^{-1}X_b) \quad (1)$$

$$P^{-1} = wP_a^{-1} + (1-w)P_b^{-1}. \quad (2)$$

The first equation (1) computes the output state vector, X, and the second equation (2) computes the covariance matrix, P. The bidding computation 320 is merely an example of a bidding computation. As noted, other computation processes can be used including processes that use other filtering techniques (extended Kalman and so forth, as described above).

In response to sending the bid 322 to the other auction system, the AV 302 may receive, from the other auction system, information for the computation and communication capabilities of the AV 302 to use for performing the perception tasks by acting as the bid-winning AV. For example, the other auction system, acting as the auctioneer, evaluates the bids 320, determines a bid-winning AV, awards the perception tasks 316 by generating update commands for the members of the connected fleet (which can include an indication of which AV has been selected), and closes the auction. The determination of the bid-winning AV can include evaluating information in the bids 320 to determine which AVs can provide higher-quality performance of the perception tasks 316 while balancing the cost to the bidding AV (e.g., to reduce the risk that the bidding AV will be unable to complete the performance because of resource demands, communication limitations, and so forth). The other AVs (e.g., the other AVs 306 and infrastructure 308) return to a default state (e.g., an explore state in which another bid announcement 314 may be received).

Acting as the bid-winning AV, the AV 302 can then perform the perception tasks 316 and generate the cooperative perception message (CPM) 318 in response to performing the perception tasks 316. The auction system 304 can send the cooperative perception message 318 to the members of the connected fleet or to the other auction system for distribution to the connected fleet. For example, the AV 302 can use the auction system 304 to generate the CPM 318, including at least the aligned and transformed state prediction for the AV 302 and the merged object detection list 334, as described above, along with the output state vector (X) of the merged object detection list 334 and its covariance matrix (P). The AV 302 can send the CPM 318 to the members of the connected fleet or to the other auction system using, for example, the communications devices 312. The other auction system can then update the connected fleet, providing information about objects that may be hidden from the perception systems of some AVs in the connected fleet (e.g., objects in the occlusion zone 124). In some implementations, the auction system 304 and the other auction system can transmit the aligned and transformed state prediction for the AV 302 and the merged object detection list 334, along with the output state vector of the merged object detection list 334 (and its covariance matrix) to one or more driving systems 336 of the AV 302 or the other AVs 306 (e.g., the driving system 116). The driving systems 336 can use the transmitted perception information to improve navigation and driving tasks, such as avoiding objects that are hidden from the perception system of the respective AVs. In this way, the described techniques can provide a safer and more-comfortable autonomous and/or semi-autonomous driving experience.

In some implementations, the AV 302 may also receive from the auction system, an update command. The update command can be based on the auction system monitoring progress of the AV 302 in performing the perception tasks 316. For example, if there is a new task, a deleted task, or a modified task. In other cases, the AV 302 may not be able to perform the perception tasks 316 according to the bid (e.g., because of sensor or communication failure, unforeseen local tasks, and so forth), and the auction system can use the update command to terminate the AV 302 as the performer.

The auction system 304 (or 114) may also act as the auctioneer (e.g., as the other auction system as described above). For example, the AV 302 may be selected to act as the "auctioneer" based on a random or rotating selection process, as described above. In response to being selected to act as the "auctioneer" or the auction system, the auction system 304 can send, to the connected fleet the bid announcement 314 for performing another perception task (e.g., another of the perception tasks 316) using at least one AV of the connected fleet (e.g., the AV 302, the other AVs 306, and/or the infrastructure 308). As described above, the bid announcement 314 can include a set of computation and communication capabilities for performing the other perception task 316.

The auction system 304 that is acting as the "auctioneer" can also receive, from at least one AV of the connected fleet that has the computation and communication capabilities for performing the other perception task 316, a bid for the computational and communication capabilities of the at least one AV to perform the other perception task 316 (e.g., another bid 322). As described, the bid 322 may be based on an estimated cost for the computation and communication capabilities of the responding connected AVs to perform the other perception task. The estimated cost can be determined using, for example, the bidding computation 320 as described above.

In response to receiving the other bids 320 from other AVs of the connected fleet, the auction system 304 can determine, based on the other bids 320, one or more AVs of the connected fleet to act as the bid-winning AV. The bid-winning AVs may be selected as described above. For example, the auction system 304 can evaluate the other bids 320 to determine which AVs can provide higher-quality performance of the other perception tasks 316 while balancing the cost to the bidding AV (e.g., to reduce the risk that the bidding AV will be unable to complete the performance because of resource demands, communication limitations, and so forth).

When the one or more bid-winning AVs are determined, the auction system 304 and send, to the second bid-winning AV (or AVs), information for the computation and communication capabilities of the second bid-winning AV to use for performing the other perception task. For example, as described above, the auction system 304 can award the other perception tasks 316 by generating update commands for the members of the connected fleet (which can include an indication of which AV has been selected) and close the auction.

Figure 4:
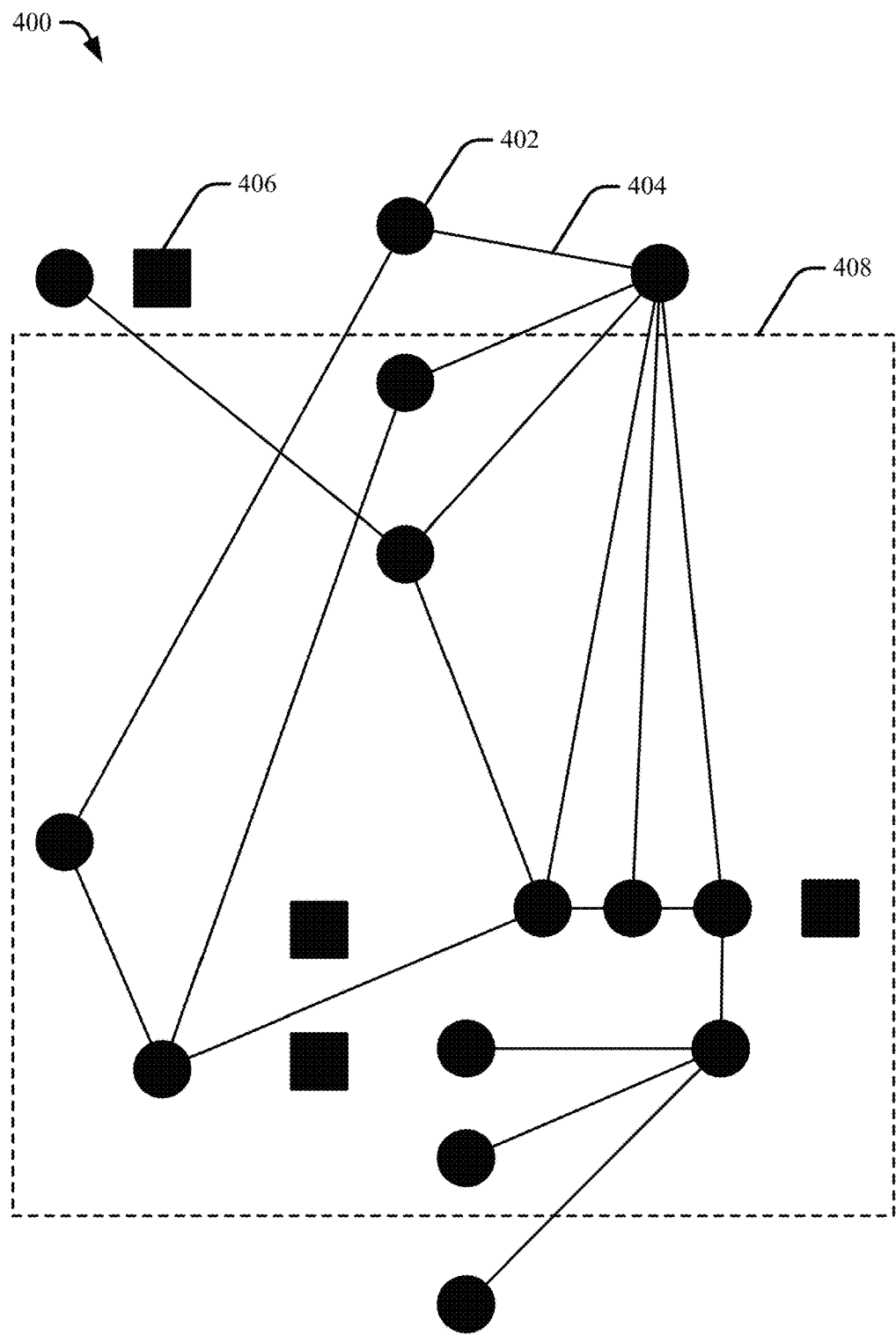
FIG. 4 illustrates an example fleet of connected AVs.

FIG. 4 illustrates an example fleet of connected AVs 400 (connected fleet 400). The example connected fleet 400 may include various entities 402, including AV or other devices (e.g., the AV 302, the other AVs 306, and/or the infrastructure 308), which are represented by solid circles. The entities 402 are connected via communication links 404, represented by solid lines. Other entities 406 (e.g., other AVs, other devices, or other non-AV vehicles), represented with solid squares, may be present in an area around the connected fleet 400, even if the other entities 406 are not members of the connected fleet 400. The connected fleet 400 may exist based upon the communication links 404. For example, the connected fleet 400 can include all or most of the entities 402 that are connected via the communication links 404, no matter their location. In other implementations, the connected fleet may comprise all or most of the entities 402 that are connected via the communication links 404 and are within an adjustable fleet area 408. For example, the adjustable fleet area 408 may be a rectangle that covers a region of a city (e.g., a downtown area with higher traffic density or a more-rural area with curvy roads and hills), as shown in FIG. 4. In some implementations (not shown), the adjustable fleet area 408 can be a circular area with a radius that can change based on the environment (e.g., an amount of traffic, road structure and condition) and/or a size of the connected fleet 400.

Example Methods

FIGS. 5-1, 5-2, and 6 illustrate example methods 500 and 600 to enable auction-based cooperative perception for autonomous and semi-autonomous driving systems. The methods 500 and 600 are shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the example environment 100 of FIG. 1, and entities detailed in FIGS. 1 through 4, reference to which is made for only for the purpose of example. The described techniques are not limited to performance by one entity or multiple entities.

At 502, at least one connected autonomous vehicle (AV) of a vehicle fleet (e.g., a connected fleet, as described above) receives from an auction system, a bid announcement for performing a perception task using the connected AV. The bid announcement can include a set of computation and communication capabilities for performing the perception task using the connected AV. For example, the AV 102 or 302 can receive the bid announcement (e.g., the bid announcement 314) from an auction system. The auction system may be a member of the vehicle fleet that is acting as an "auctioneer" (e.g., the other AV 306 or the infrastructure 308) and may be selected via a random selection process or a rotating selection process as described above. Throughout the description of the method 500, references to acts of the AV 102 or 302 can include acts performed by the auction-based cooperative perception system 114 or 304, respectively.

The perception task can be one or more of the perception tasks 316, which can include one or more items of the cooperative perception message CPM 318 as described with reference to at least FIG. 3. The computation and communication capabilities can include capabilities that are related to types of sensors, the field-of-view of the sensors, communication and/or computation latency, bandwidth for communication and computation, and so forth.

At 504, the connected AV determines, based on the bid announcement, whether the connected AV has the computation and communication capabilities for performing the perception task. For example, the AV 102 or 302 evaluates its sensors, computation capability, and communication capability to determine whether the AV 102 or 302 can perform the perception task or tasks 316. In some implementations, another entity that is associated with or in communication with the connected AV can make the determination.

At 506, the connected AV estimates, based on a bidding computation, a cost for the computation and communication capabilities of the connected AV to perform the perception task. For example, the AV 102 or 302 can estimate the cost (e.g., a "self-interest" of the AV 102 or 302) to perform the announced perception tasks 316. The cost estimation may be an estimation of the capability that the AV 102 or 302 has in light of the perception tasks 316 and the required capabilities. In some cases, the cost estimation can be a determination of whether the AV will bid, in view of the perception tasks 316 and using the bidding computation 320. In these cases, only AVs that have the computation and communication capabilities for performing the perception task perform the cost estimation. In some implementations, another entity that is associated with or in communication with the connected AV can make the estimation.

The bidding computation 320 can include several steps, as described above with reference to FIGS. 1-4. For example, the bidding computation 320 can include determining a state estimate of the bidding (or bid-winning AV). The state estimate can be described using coordinates that describe at least a predicted position and a predicted orientation of the AV. The bidding computation 320 can also include determining an object detection list for objects detected by the AV, along with a covariance matrix for the object detection lists. The object detection lists and their covariance matrices can be described using other coordinates that describe at least a predicted position and a predicted orientation of the objects detected by the AV. The state estimate and object detection lists can be determined using a static or a dynamic model, as described above. The bidding computation 320 can also include converting the coordinates of the state estimate, the object detection lists, and the covariance matrices to coordinates of a global coordinate system.

Additionally, the bidding computation 320 can include constructing a validation matrix by aligning each of the predicted positions from the object detection lists to a common reference point. The aligned predicted positions of the validation matrix become or include a merged object detection list. The validation matrix can be constructed using Mahalanobis distances between the positions of objects of the object detection lists and one or more of a Kalman filter, an extended Kalman filter, an unscented Kalman filter, or a particle filter. The bidding computation 320 can also include using a covariance intersection method to compute an output state vector of the predicted positions in the merged object detection list and another covariance matrix for the output state vector.

At 508, the connected AV sends to the auction system, based on the estimated cost, a bid for the computation and communication capabilities of the connected AV to perform the perception task. For example, the AV 102 or 302 can send, to the auctioneer, a bid 322 for using the computation and communication capabilities of the AV 102 or 302 to perform the perception tasks 316. In some implementations, the bid can include information about the determined costs and evaluated capabilities (e.g., what the AV 102 or 302, the auction system 114 or 304, and the sensors 106 or 310 can do, the quality of the computations, how fast the computations can be performed and communicated, and how often the computations and communications can be repeated). In some implementations, another entity that is associated with or in communication with the connected AV can send the bid. Additional operations of the method 500 are shown in FIG. 5-2 at operation "A" as shown in FIG. 5-1.

Figures 2, 5:
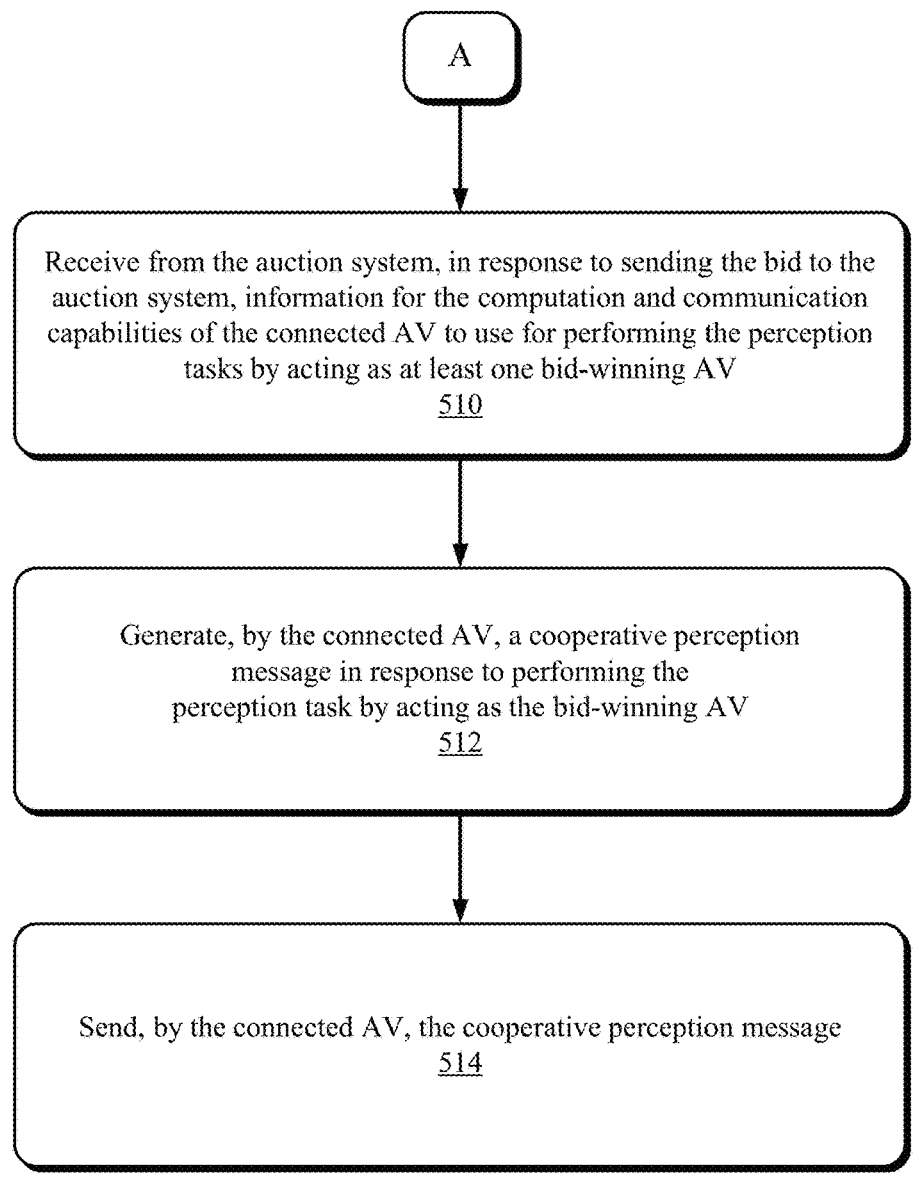

FIG. 5-2 illustrates additional operations of the method 500 at operation "A." At 510, responsive to sending the bid to the auction system, the connected AV receives, from the auction system, information for the computation and communication capabilities of the connected AV to use for performing the perception tasks by acting as at least one bid-winning AV. For example, the AV 102 or 302 can receive from the auctioneer the information for the computation and communication capabilities of the AV 102 or 302 to use for performing the perception tasks 316. In some implementations, the auctioneer evaluates the bids 320, determines a bid-winning AV, awards the perception tasks 316 by generating update commands for the members of the connected fleet (which can include an indication of which AV has been selected), and closes the auction. The information can therefore include the update commands, the indication of the bid-winning AV, and the closure. In other cases, the information may be update commands with refinements or changes to the timing, communication, and/or computations (e.g., changes that may not affect the cost). The determination of the bid-winning AV can include evaluating information in the bids 320 to determine which AVs can provide higher-quality performance of the perception tasks 316 while balancing the cost to the bidding AV (e.g., to reduce the risk that the bidding AV will be unable to complete the performance because of resource demands, communication limitations, and so forth). The other AVs (e.g., the other AVs 306 and infrastructure 308 that are non-bid-winning) return to a default state (e.g., an explore state in which another bid announcement 314 may be received).

At 512, the connected AV, acting as the bid-winning AV, generates a cooperative perception message in response to performing the perception task. For example, the bid-winning AV 102 or 302 can perform the perception tasks 316 and, in response, generate the cooperative perception message (CPM) 318. The AV 102 or 302 can generate CPM 318 to include at least an aligned and transformed state prediction for the AV 102 or 302 and the merged object detection list 334, as described above, along with the output state vector (X) of the merged object detection list 334 and its covariance matrix (P). In some implementations, the 102 or 302 can generate the CPM 318 or an update command.

At 514, the connected AV, acting as the bid-winning AV, sends the cooperative perception message. For example, the bid-winning AV 102 or 302 can send the CPM 318 or the update command as described above. The bid-winning AV 102 or 302 can send the CPM 318 (or the update command) to the connected fleet (e.g., to all the members of the connected fleet), to the auction system (e.g., for distribution to the connected fleet), or to another entity that can distribute the CPM 318 or the update command to the connected fleet.

In some implementations, the AV 302 may also receive from the auction system, additional update commands. The update commands can be based on the auction system monitoring progress of the AV 302 in performing the perception tasks 316. For example, if there is a new task, a deleted task, or a modified task. In other cases, the AV 302 may not be able to perform the perception tasks 316 according to the bid (e.g., because of sensor or communication failure, unforeseen local tasks, and so forth), and the auction system can use the update command to terminate the AV 302 as the performer.

FIG. 6 illustrates the method 600 to enable auction-based cooperative perception for autonomous and semi-autonomous driving systems.

At 602, an auction system sends a bid announcement to at least one connected autonomous vehicle (AV) of a vehicle fleet (e.g., a connected fleet). The bid announcement is for performing a perception task using the connected AV and includes a set of computation and communication capabilities for performing the perception task using the connected AV. For example, the auction system 114 or 304 of the AV 102 or 302, respectively, may be selected to act as the auction system (e.g., the "auctioneer") based on a random or rotating selection process, as described above. In response to being selected to act as the auction system, the auction system 114 or 304 can send the bid announcement 314 to the connected fleet. The bid announcement 314 includes an announcement for performing the perception task 316 using at least one AV of the connected fleet (e.g., the AV 302, the other AVs 306, and/or the infrastructure 308). The required capabilities of computation and communication can include capabilities that are related to communication/computation latency and bandwidth for communication and computation.

At 604, the auction system receives, from a connected AV that has the computation and communication capabilities for performing the perception task, a bid for the computation and communication capabilities of the connected AV to perform the perception task. The bid can be based on an estimated cost for the computation and communication capabilities of the connected AV to perform the perception task, and the estimated cost can be determined using a bidding computation. For example, the auction system 114 or 304 that is acting as the "auctioneer" can also receive a bid 322 from AVs of the connected fleet that have the computation and communication capabilities for performing the perception task 316. As described, the bid 322 may be based on an estimated cost for the computation and communication capabilities of the responding connected AVs to perform the perception task 316. The estimated cost can be determined using, for example, the bidding computation 320 as described above with reference to FIG. 1 through FIG. 5A.

At 606, in response to receiving the bid from the connected AV, the auction system determines, based on the bid, at least one connected AV to act as a bid-winning AV. For example, in response to receiving the bids 320 from the AVs of the connected fleet, the auction system 114 or 304 can determine, based on the bids 320, one or more AVs of the connected fleet to act as the bid-winning AV. As described above, the auction system 114 or 304 can determine the bid-winning AV by evaluating the bids 320 to determine which AVs can provide higher-quality performance of the perception tasks 316 while balancing the cost to the bidding AV (e.g., to reduce the risk that the bidding AV will be unable to complete the performance because of resource demands, communication limitations, and so forth).

At 608, the auction system sends, to the at least one bid-winning AV, information for the computation and communication capabilities of the bid-winning AV to use for performing the perception tasks. For example, the auction system 114 or 304 can send, to the bid-winning AV (or AVs), information for the computation and communication capabilities of the bid-winning AV to use for performing the perception tasks 316. As described above, for example, the auction system 114 or 304 can award the perception tasks 316 by generating update commands for the members of the connected fleet (which can include an indication of which AV has been selected) and close the auction.

The information can therefore include the update commands, the indication of the bid-winning AV, and the closure. In other cases, the information may be update commands with refinements or changes to the timing, communication, and/or computations (e.g., changes that may not affect the cost). The determination of the bid-winning AV can include evaluating information in the bids 320 to determine which AVs can provide higher-quality performance of the perception tasks 316 while balancing the cost to the bidding AV (e.g., to reduce the risk that the bidding AV will be unable to complete the performance because of resource demands, communication limitations, and so forth). The other AVs (e.g., the other AVs 306 and infrastructure 308 that are non-bid-winning) return to a default state (e.g., an explore state in which another bid announcement 314 may be received).

In some implementations, the AV 302 may also receive from the auction system, additional update commands. The update commands may be based on the auction system monitoring progress of the AV 302 in performing the perception tasks 316. For example, if there is a new task, a deleted task, or a modified task. In other cases, the AV 302 may not be able to perform the perception tasks 316 according to the bid (e.g., because of sensor or communication failure, unforeseen local tasks, and so forth), and the auction system can use the update command to terminate the AV 302 as the performer.

EXAMPLES

In the following section, examples are provided.

Example 1: A method comprising: receiving, by at least one connected autonomous vehicle (AV) of a vehicle fleet and from an auction system, a bid announcement for performing a perception task using the connected AV, the bid announcement including a set of computation and communication capabilities for performing the perception task using the connected AV; determining, based on the bid announcement, the connected AV has the computation and communication capabilities for performing the perception task using the connected AV; estimating, based on a bidding computation, a cost for the computation and communication capabilities of the connected AV to perform the perception task; sending to the auction system, based on the estimated cost, a bid for the computation and communication capabilities of the connected AV to perform the perception task; responsive to sending the bid to the auction system, receiving, from the auction system, information for the computation and communication capabilities of the connected AV to use for performing the perception tasks by acting as at least one bid-winning AV; generating, by the connected AV, a cooperative perception message in response to performing the perception task by acting as the bid-winning AV; and sending the cooperative perception message.

Example 2: The method of example 1, wherein the bidding computation comprises: determining a state estimate of the bid-winning AV, the state estimate comprising first coordinates including at least a predicted position and a predicted orientation of the bid-winning AV; determining, by the bid-winning AV, an object detection list for respective objects detected by the bid-winning AV, the object detection lists comprising second coordinates including at least a predicted position and a predicted orientation of the respective objects detected by the bid-winning AV; converting the first and second coordinates to a global coordinate system for performing the perception task; responsive to converting the first and second coordinates to the global coordinate system, constructing a validation matrix by aligning each of the predicted positions from the second coordinates to a common reference point, the aligned predicted positions of the validation matrix comprising a merged object detection list; and using a covariance intersection method to compute: an output state vector of the predicted positions in the merged object detection list to include with the cooperative perception message; and a first covariance matrix for the output state vector for correcting the output state vector.

Example 3: The method of example 2, wherein determining the state estimate of the bid-winning AV and the object detection list comprises using one or more of: a static model, in which at least a turn rate, an orientation, and an orientation of the bid-winning AV and of detected objects of the object detection list are modeled as constants; or a dynamic model, in which at least the turn rate, the orientation, and the orientation of the bid-winning AV and of detected objects of the object detection list are modeled using at least a transition density and a Chapman-Kolmogorov equation.

Example 4: The method of example 2, further comprising: determining a second covariance matrix for each respective object detection list; and converting a coordinate basis of each of the second covariance matrices from a coordinate system based on the position and orientation of the bid-winning AV to the global coordinate system.

Example 5: The method of example 2, further comprising constructing the validation matrix using: Mahalanobis distances between the positions of objects of the object detection lists; and one or more of a Kalman filter, an extended Kalman filter, an unscented Kalman filter, or a particle filter.

Example 6: The method of example 1, further comprising: receiving, from the auction system, an update command, the update command based on monitoring, by the auction system, progress of a performance of the perception task by the bid-winning AV.

Example 7: The method of example 1, wherein: the auction system is a member of the AV fleet; and the auction system is selected using at least one of: a random selection method; or a rotational selection method in which respective members of the AV fleet take turns serving as the auction system based on an algorithm.

Example 8: The method of example 1, wherein the connected AV fleet comprises: a plurality of AVs in electronic communication with each other; and the plurality of AVs comprises autonomous ground vehicles, autonomous aerial vehicles, or both autonomous ground vehicles and autonomous aerial vehicles.

Example 9: A method, comprising: sending, by an auction system to at least one connected autonomous vehicle (AV) of a vehicle fleet, a bid announcement for performing a perception task using the connected AV, the bid announcement including a set of computation and communication capabilities for performing the perception task using the connected AV; receiving, from a connected AV that has the computation and communication capabilities for performing the perception task, a bid for the computation and communication capabilities of the connected AV to perform the perception task, the bid based on an estimated cost for the computation and communication capabilities of the connected AV to perform the perception task, the estimated cost determined using a bidding computation; responsive to receiving the bid from the at least one connected AV, determining, based at least in part on the bid, at least one connected AV to act as a bid-winning AV; and sending, to the at least one bid-winning AV and from the auction system, information for the computation and communication capabilities of the bid-winning AV to use for performing the perception tasks.

Example 10: The method of example 9, wherein the bidding computation comprises: determining a state estimate of the bid-winning AV, the state estimate comprising first coordinates including at least a predicted position and a predicted orientation of the bid-winning AV; determining, by the bid-winning AV, an object detection list for respective objects detected by the bid-winning AV, the object detection lists comprising second coordinates including at least a predicted position and a predicted orientation of the respective objects detected by the bid-winning AV; converting the first and second coordinates to a global coordinate system for performing the perception task; responsive to converting the first and second coordinates to the global coordinate system, constructing a validation matrix by aligning each of the predicted positions from the second coordinates to a common reference point, the aligned predicted positions of the validation matrix comprising a merged object detection list; and using a covariance intersection method to compute: an output state vector of the predicted positions in the merged object detection list to include with the cooperative perception message; and a first covariance matrix for the output state vector for correcting the output state vector.

Example 11: The method of example 10, wherein determining the state estimate of the bid-winning AV and the object detection list comprises using one or more of: a static model, in which at least a turn rate, an orientation, and an orientation of the bid-winning AV and of detected objects of the object detection list are modeled as constants; or a dynamic model, in which at least the turn rate, the orientation, and the orientation of the bid-winning AV and of detected objects of the object detection list are modeled using at least a transition density and a Chapman-Kolmogorov equation.

Example 12: The method of example 10, further comprising: determining a second covariance matrix for each respective object detection list; and converting a coordinate basis of each of the second covariance matrices from a coordinate system based on the position and orientation of the bid-winning AV to the global coordinate system.

Example 13: The method of example 10, further comprising constructing the validation matrix using: Mahalanobis distances between the positions of objects of the object detection lists; and one or more of a Kalman filter, an extended Kalman filter, an unscented Kalman filter, or a particle filter.

Example 14: The method of example 9, further comprising: monitoring, by the auction system, progress of a performance of the perception task by the bid-winning AV; and sending, by the auction system, update messages to the bid-winning AV.

Example 15: The method of example 9, wherein: the auction system is a member of the AV fleet; and the auction system is selected using at least one of: a random selection method; or a rotational selection method in which respective members of the AV fleet take turns serving as the auction system based on an algorithm.

Example 16: The method of example 9, wherein selecting the bid-winning AV further comprises: determining, by the auction system, the bid-winning AV; announcing the bid-winning AV to the AV fleet; generating an update command; sending the update command to the bid-winning AV; and closing the auction.

Example 17: The method of example 9, wherein the connected AV fleet comprises: a plurality of AVs in electronic communication with each other; and the plurality of AVs comprises autonomous ground vehicles, autonomous aerial vehicles, or both autonomous ground vehicles and autonomous aerial vehicles.

Example 18: A system, comprising: a first autonomous vehicle (AV) of a connected vehicle fleet, the first AV including at least one processor configured to: receive, from a first auction system, a bid announcement for performing a perception task using the first AV, the bid announcement including a set of computation and communication capabilities for performing the perception task using the first AV; determine, based on the bid announcement, the first AV has the computation and communication capabilities for performing the perception task using the first AV; estimate, based on a bidding computation, a cost for the computation and communication capabilities of the first AV to perform the perception task; send to the first auction system, a bid for the computation and communication capabilities of the first AV to perform the perception task, the bid based on the cost; responsive to sending the bid to the first auction system, receive, from the auction system, information for the computation and communication capabilities of the first AV to use for performing the perception tasks by acting as a first bid-winning AV; generate a cooperative perception message in response to performing the perception task by acting as the first bid-winning AV; send, to the first auction system, the cooperative perception message; responsive to being selected to act as a second auction system, send to the vehicle fleet a bid announcement for performing another perception task using at least one AV of the connected fleet, the bid announcement including a set of computation and communication capabilities for performing the other perception task; receive, from at least one AV that has the computation and communication capabilities for performing the perception task, a bid for the computation and communication capabilities of the at least one AV to perform the other perception task, the bid based on an estimated cost for the computation and communication capabilities of the at least one AV to perform the other perception task and the estimated cost determined using at least the bidding computation; responsive to receiving the bid from the at least one AV, determining, based on the bid, a second AV to act as a second bid-winning AV; and sending, to the second bid-winning AV and from the auction system, information for the computation and communication capabilities of the second bid-winning AV to use for performing the other perception task.

Example 19: The system of example 18, wherein the bidding computation comprises: determining a state estimate of the first or second bid-winning AV, the state estimate comprising first coordinates including at least a predicted position and a predicted orientation of the first or second bid-winning AV; determining a first object detection list for respective objects detected by the first bid-winning AV or a second object detection list for respective objects detected by the second bid-winning AV, the object detection lists comprising second coordinates including at least a predicted position and a predicted orientation of the respective objects detected by the first or second bid-winning AV; converting the first and second coordinates to a global coordinate system for generating the CPM; aligning the predicted positions of the objects of the object detection lists to a common reference point by constructing a validation matrix, the aligned objects comprising a merged object detection list; and using a covariance intersection method to compute: an output state vector of the detected objects in the merged object detection list to include with the cooperative perception message; and a first covariance matrix for the output state vector for correcting the output state vector.

Example 20: The system of example 19, wherein the processor is further configured to: determine the state estimate of the first or second bid-winning AV and the object detection list of the first or second bid-winning AV using one or more of: a static model, in which at least a turn rate and an orientation of the first or second bid-winning AV and of detected objects of the first or second object detection list are modeled as constants; or a dynamic model, in which at least the turn rate, the orientation, and the orientation of the bid-winning AV and of detected objects of the object detection list are modeled using at least a transition density and a Chapman-Kolmogorov equation; and determine a second covariance matrix for each respective object detection list of the first or second bid-winning AV; convert a coordinate basis of each of the second covariance matrices from a coordinate system based on the position and orientation of the first or second bid-winning AV to the global coordinate system; and construct the validation matrix using: Mahalanobis distances between the positions of objects of the first or second object detection lists; and one or more of a Kalman filter, an extended Kalman filter, an unscented Kalman filter, or a particle filter.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method comprising:
receiving, by at least one connected autonomous vehicle (AV) of a vehicle fleet and from an auction system, a bid announcement for performing a perception task using the connected AV, the bid announcement including a set of computation and communication capabilities for performing the perception task using the connected AV;
determining, based on the bid announcement, the connected AV has the computation and communication capabilities for performing the perception task using the connected AV;
estimating, based on a bidding computation, a cost for the computation and communication capabilities of the connected AV to perform the perception task, the bidding computation comprising:
  determining a state estimate of the connected AV, the state estimate comprising first coordinates including at least a predicted position and a predicted orientation of the connected AV;
  determining, by the connected AV, an object detection list for respective objects detected by the connected AV, the object detection lists comprising second coordinates including at least a predicted position and a predicted orientation of the respective objects detected by the connected AV;
  converting the first and second coordinates to a global coordinate system for performing the perception task;
  responsive to converting the first and second coordinates to the global coordinate system, constructing a validation matrix by aligning each of the predicted positions from the second coordinates to a common reference point, the aligned predicted positions of the validation matrix comprising a merged object detection list; and
  using a covariance intersection method to compute:
    an output state vector of the predicted positions in the merged object detection list to include with the cooperative perception message; and
    a first covariance matrix for the output state vector for correcting the output state vector;
sending to the auction system, based on the estimated cost, a bid for the computation and communication capabilities of the connected AV to perform the perception task;
responsive to sending the bid to the auction system, receiving, from the auction system, information for the computation and communication capabilities of the connected AV to use for performing the perception tasks by acting as at least one bid-winning AV;
generating, by the connected AV, a cooperative perception message in response to performing the perception task by acting as the bid-winning AV; and
sending the cooperative perception message.

2. The method of claim 1, wherein determining the state estimate of the connected AV and the object detection list comprises using one or more of:
a static model, in which at least a turn rate, an orientation, and an orientation of the connected AV and of detected objects of the object detection list are modeled as constants; or
a dynamic model, in which at least the turn rate, the orientation, and the orientation of the connected AV and of detected objects of the object detection list are modeled using at least a transition density and a Chapman-Kolmogorov equation.

3. The method of claim 1, further comprising:
determining a second covariance matrix for each respective object detection list; and
converting a coordinate basis of each of the second covariance matrices from a coordinate system based on the position and orientation of the connected AV to the global coordinate system.

4. The method of claim 1, further comprising constructing the validation matrix using:
Mahalanobis distances between the positions of objects of the object detection lists; and
one or more of a Kalman filter, an extended Kalman filter, an unscented Kalman filter, or a particle filter.

5. The method of claim 1, further comprising:
receiving, from the auction system, an update command, the update command based on monitoring, by the auction system, progress of a performance of the perception task by the bid-winning AV.

6. The method of claim 1, wherein:
the auction system is a member of the AV fleet; and
the auction system is selected using at least one of:
a random selection method; or
a rotational selection method in which respective members of the AV fleet take turns serving as the auction system based on an algorithm.

7. The method of claim 1, wherein the connected AV fleet comprises:
a plurality of AVs in electronic communication with each other; and
the plurality of AVs comprises autonomous ground vehicles, autonomous aerial vehicles, or both autonomous ground vehicles and autonomous aerial vehicles.

8. A method, comprising:
sending, by an auction system to at least one connected autonomous vehicle (AV) of a vehicle fleet, a bid announcement for performing a perception task using the connected AV, the bid announcement including a set of computation and communication capabilities for performing the perception task using the connected AV;
receiving, from a connected AV that has the computation and communication capabilities for performing the perception task, a bid for the computation and communication capabilities of the connected AV to perform the perception task, the bid based on an estimated cost for the computation and communication capabilities of the connected AV to perform the perception task, the estimated cost determined using a bidding computation, the bidding computation comprising:
determining a state estimate of the connected AV, the state estimate comprising first coordinates including at least a predicted position and a predicted orientation of the connected AV;
determining, by the connected AV, an object detection list for respective objects detected by the connected AV, the object detection lists comprising second coordinates including at least a predicted position and a predicted orientation of the respective objects detected by the connected AV;
converting the first and second coordinates to a global coordinate system for performing the perception task;
responsive to converting the first and second coordinates to the global coordinate system, constructing a validation matrix by aligning each of the predicted positions from the second coordinates to a common reference point, the aligned predicted positions of the validation matrix comprising a merged object detection list; and
using a covariance intersection method to compute:
an output state vector of the predicted positions in the merged object detection list to include with the cooperative perception message; and
a first covariance matrix for the output state vector for correcting the output state vector;
responsive to receiving the bid from the at least one connected AV, determining, based at least in part on the bid, at least one connected AV to act as a bid-winning AV; and
sending, to the at least one bid-winning AV and from the auction system, information for the computation and communication capabilities of the bid-winning AV to use for performing the perception tasks.

9. The method of claim 8, wherein determining the state estimate of the connected AV and the object detection list comprises using one or more of:
a static model, in which at least a turn rate, an orientation, and an orientation of the connected AV and of detected objects of the object detection list are modeled as constants; or
a dynamic model, in which at least the turn rate, the orientation, and the orientation of the connected AV and of detected objects of the object detection list are modeled using at least a transition density and a Chapman-Kolmogorov equation.

10. The method of claim 8, further comprising:
determining a second covariance matrix for each respective object detection list; and
converting a coordinate basis of each of the second covariance matrices from a coordinate system based on the position and orientation of the connected AV to the global coordinate system.

11. The method of claim 8, further comprising constructing the validation matrix using:
Mahalanobis distances between the positions of objects of the object detection lists; and
one or more of a Kalman filter, an extended Kalman filter, an unscented Kalman filter, or a particle filter.

12. The method of claim 8, further comprising:
monitoring, by the auction system, progress of a performance of the perception task by the bid-winning AV; and
sending, by the auction system, update messages to the bid-winning AV.

13. The method of claim 8, wherein:
the auction system is a member of the AV fleet; and
the auction system is selected using at least one of:
a random selection method; or
a rotational selection method in which respective members of the AV fleet take turns serving as the auction system based on an algorithm.

14. The method of claim 8, wherein selecting the bid-winning AV further comprises:
determining, by the auction system, the bid-winning AV;
announcing the bid-winning AV to the AV fleet;
generating an update command;
sending the update command to the bid-winning AV; and
closing the auction.

15. The method of claim 8, wherein the connected AV fleet comprises:
a plurality of AVs in electronic communication with each other; and the plurality of AVs comprises autonomous ground vehicles, autonomous aerial vehicles, or both autonomous ground vehicles and autonomous aerial vehicles.

16. A system, comprising:
a first autonomous vehicle (AV) of a connected vehicle fleet, the first AV including at least one processor configured to:
  receive, from a first auction system, a bid announcement for performing a perception task using the first AV, the bid announcement including a set of computation and communication capabilities for performing the perception task using the first AV;
  determine, based on the bid announcement, the first AV has the computation and communication capabilities for performing the perception task using the first AV;
  estimate, based on a bidding computation, a cost for the computation and communication capabilities of the first AV to perform the perception task;
  send to the first auction system, a bid for the computation and communication capabilities of the first AV to perform the perception task, the bid based on the cost;
  responsive to sending the bid to the first auction system, receive, from the first auction system, information for the computation and communication capabilities of the first AV to use for performing the perception tasks by acting as a first bid-winning AV;
  generate a cooperative perception message (CPM) in response to performing the perception task by acting as the first bid-winning AV;
  send, to the first auction system, the cooperative perception message;
  responsive to being selected to act as a second auction system, send to the vehicle fleet a bid announcement for performing another perception task using at least one AV of the connected fleet, the bid announcement including a set of computation and communication capabilities for performing the other perception task;
  receive, from at least one AV that has the computation and communication capabilities for performing the perception task, a bid for the computation and communication capabilities of the at least one AV to perform the other perception task, the bid based on an estimated cost for the computation and communication capabilities of the at least one AV to perform the other perception task and the estimated cost determined using another bidding computation, the bidding computation or the other bidding computation comprising:
    determining a state estimate of the first AV or the at least one AV, respectively, the state estimate comprising first coordinates including at least a predicted position and a predicted orientation of the first AV or the at least one AV, respectively;
    determining an object detection list for respective objects detected by the first AV or a second object detection list for respective objects detected by the at least one AV, the object detection lists comprising second coordinates including at least a predicted position and a predicted orientation of the respective objects detected by the first AV or the at least one AV, respectively;
    converting the first and second coordinates to a global coordinate system for performing the perception task;
    aligning the predicted positions of the objects of the object detection lists to a common reference point by constructing a validation matrix, the aligned objects comprising a merged object detection list; and
    using a covariance intersection method to compute:
      an output state vector of the predicted positions in the merged object detection list to include with the cooperative perception message; and
      a first covariance matrix for the output state vector for correcting the output state vector;
  responsive to receiving the bid from the at least one AV, determining, based on the bid, a second AV to act as a second bid-winning AV; and
  sending, to the second bid-winning AV and from the auction system, information for the computation and communication capabilities of the second bid-winning AV to use for performing the other perception task.

17. The system of claim 16, wherein the processor is further configured to:
  determine the state estimate of the first AV or the at least one AV and the object detection list of the first AV or the at least one AV using one or more of:
    a static model, in which at least a turn rate and an orientation of the first AV or the at least one AV and of detected objects of the first or second object detection list are modeled as constants, respectively; or
    a dynamic model, in which at least the turn rate, the orientation, and the orientation of the bid-winning AV and of detected objects of the object detection list are modeled using at least a transition density and a Chapman-Kolmogorov equation; and
  determine a second covariance matrix for each respective object detection list of the first AV or the at least one AV;
  convert a coordinate basis of each of the second covariance matrices from a coordinate system based on the position and orientation of the first AV or the at least one AV to the global coordinate system; and
  construct the validation matrix using:
    Mahalanobis distances between the positions of objects of the first or second object detection lists; and
    one or more of a Kalman filter, an extended Kalman filter, an unscented Kalman filter, or a particle filter.

18. The system of claim 16, wherein the connected AV fleet comprises:
  a plurality of AVs in electronic communication with each other; and
  the plurality of AVs comprises autonomous ground vehicles, autonomous aerial vehicles, or both autonomous ground vehicles and autonomous aerial vehicles.

19. The system of claim 16, wherein:
  the first auction system is a member of the AV fleet; and
  the first auction system is selected using at least one of:
    a random selection method; or
    a rotational selection method in which respective members of the AV fleet take turns serving as the first auction system based on an algorithm.

20. The system of claim 16, wherein the processor is further configured to:
  receive, from the first auction system, an update command, the update command based on monitoring, by the first auction system, progress of a performance of the perception task by the first bid-winning AV.

* * * * *